US011854369B2

(12) United States Patent
Yegavolla

(10) Patent No.: US 11,854,369 B2
(45) Date of Patent: Dec. 26, 2023

(54) MULTI-COMPUTER PROCESSING SYSTEM FOR COMPLIANCE MONITORING AND CONTROL

(71) Applicant: Allstate Insurance Company, Northbrook, IL (US)

(72) Inventor: Tirumala Reddy Yegavolla, Wheeling, IL (US)

(73) Assignee: Allstate Insurance Company, Northbrook, IL (US)

(*) Notice: Subject to any disclaimer, the term of this patent is extended or adjusted under 35 U.S.C. 154(b) by 131 days.

(21) Appl. No.: 17/502,314

(22) Filed: Oct. 15, 2021

(65) Prior Publication Data

US 2022/0122448 A1 Apr. 21, 2022

Related U.S. Application Data

(60) Provisional application No. 63/092,932, filed on Oct. 16, 2020.

(51) Int. Cl.
*G08B 21/24* (2006.01)
*H04N 7/18* (2006.01)
*G06V 20/52* (2022.01)
*G06F 18/2113* (2023.01)

(52) U.S. Cl.
CPC ........ *G08B 21/245* (2013.01); *G06F 18/2113* (2023.01); *G06V 20/52* (2022.01); *H04N 7/18* (2013.01)

(58) Field of Classification Search
CPC ... G08B 21/245; G06F 18/2113; G06V 20/52; H04N 7/18; H04N 7/181; G06Q 10/06393; G06Q 30/018; G06Q 30/0282
See application file for complete search history.

(56) References Cited

U.S. PATENT DOCUMENTS

| | | | |
|---|---|---|---|
| 10,593,188 B2 * | 3/2020 | Shoari | G08B 21/245 |
| 2010/0153374 A1 * | 6/2010 | LeBlond | G06Q 10/06398 |
| | | | 707/769 |
| 2011/0093313 A1 * | 4/2011 | LeBlond | G16H 40/20 |
| | | | 705/7.42 |
| 2014/0009292 A1 * | 1/2014 | Long | H04Q 9/00 |
| | | | 340/573.1 |
| 2014/0279603 A1 * | 9/2014 | Ortiz | G16H 40/20 |
| | | | 705/317 |

(Continued)

*Primary Examiner* — An T Nguyen
(74) *Attorney, Agent, or Firm* — Dinsmore & Shohl LLP

(57) ABSTRACT

Aspects of the disclosure relate to a multi-computer processing system for compliance monitoring and control. A computing platform having at least one processor, a communication interface, and memory may receive hygiene-related information from one or more data sources. In addition, the one or more data sources includes one or more sensors for capturing the hygiene-related information. Subsequently, the computing platform may analyze the hygiene-related information received from the one or more of data sources and generate a hygiene compliance score. In addition, the hygiene compliance score may indicate an extent to which the hygiene-related information matches a plurality of guidelines. Then, the computing platform may store the hygiene-related information in a database and output the hygiene compliance score in response to a request.

20 Claims, 7 Drawing Sheets

(56) References Cited

U.S. PATENT DOCUMENTS

| | | | |
|---|---|---|---|
| 2015/0032264 A1* | 1/2015 | Emmons | F24F 11/0001 |
| | | | 700/276 |
| 2019/0050762 A1* | 2/2019 | Lee | G06Q 50/10 |
| 2019/0206226 A1* | 7/2019 | Lindström | G08B 21/245 |
| 2019/0354907 A1* | 11/2019 | Granucci | G06Q 10/087 |
| 2020/0050995 A1* | 2/2020 | Ramanand | G06Q 10/06395 |
| 2020/0321104 A1* | 10/2020 | Lindström | G16H 40/67 |
| 2021/0174665 A1* | 6/2021 | Shoari | G08B 21/245 |
| 2021/0350127 A1* | 11/2021 | Droux | G05D 1/0219 |
| 2022/0005112 A1* | 1/2022 | Woo | G06Q 30/0645 |
| 2022/0074935 A1* | 3/2022 | Liu | G16H 40/20 |
| 2022/0122448 A1* | 4/2022 | Yegavolla | G06Q 30/0282 |
| 2023/0014548 A1* | 1/2023 | Podvent | G16H 40/67 |

\* cited by examiner

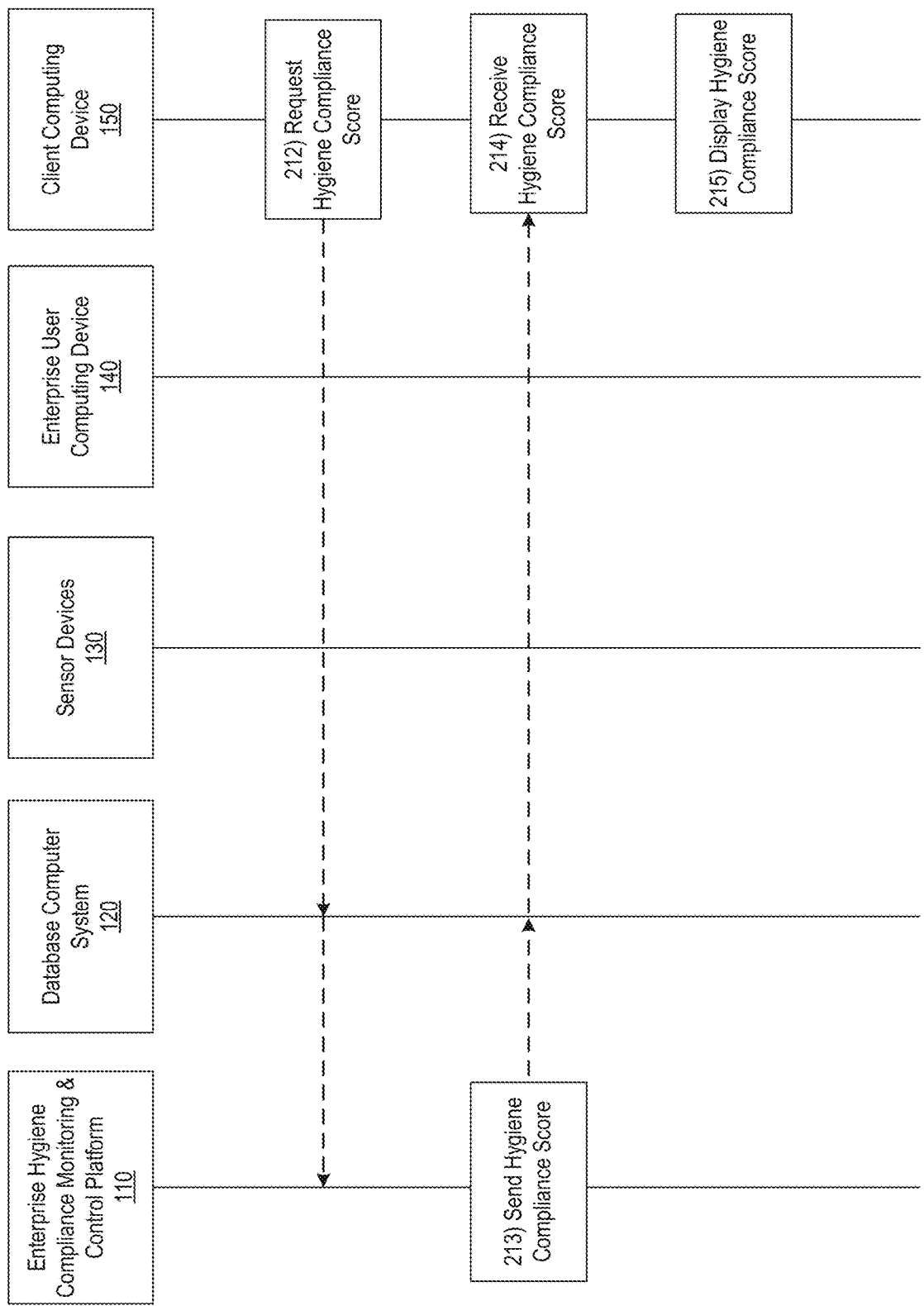

US 11,854,369 B2

MULTI-COMPUTER PROCESSING SYSTEM FOR COMPLIANCE MONITORING AND CONTROL

CROSS-REFERENCE TO RELATED APPLICATIONS

The present disclosure claims priority to U.S. Pat. App. No. 63/092,932, filed Oct. 16, 2020, the entirety of which is incorporated by reference herein.

BACKGROUND

Aspects of the disclosure relate to processing systems. In particular, aspects of the disclosure relate to processing systems having automated compliance monitoring and control.

In some instances, individuals may wish to determine whether a business or retail establishment is following recommended hygiene protocols prior to entering the establishment. In many instances, however, besides a hygiene rating in the form of a letter or a number displayed at entrances of food-serving establishments summarizing their most recent health inspection, for example, it is difficult for consumers to assess hygiene practices of an establishment, understand hygiene ratings of non-food-serving establishments, and the like. In addition, in some instances, businesses with low hygiene ratings might not display their rating. In many instances, businesses are not required to display their ratings or are not given ratings. Further, compliance with one or more protocols may be based, in conventional systems, on self-reporting and/or in-person inspections. This may make assessing compliance with protocols difficult and may cause inefficiencies and inaccuracies in controlling compliance.

SUMMARY

Aspects of the disclosure provide effective, efficient, scalable, and convenient technical solutions that address and overcome the technical problems associated with a multi-computer processing system for compliance monitoring and control.

In accordance with one or more embodiments, a computing platform having at least one processor, a communication interface, and memory may receive hygiene-related information from one or more data sources. In addition, the one or more data sources may include one or more sensors for capturing the hygiene-related information. Subsequently, the computing platform may analyze based on the hygiene-related information received from the one or more data sources. In turn, the computing platform may generate a hygiene compliance score. In addition, the hygiene compliance score may indicate an extent to which the hygiene-related information matches a plurality of guidelines. Next, the computing platform may store the hygiene-related information in a database. Then, the computing platform may output the hygiene compliance score in response to a request.

In some embodiments, the one or more sensors include one or more of: a video camera, a security camera, a microphone, an infrared sensor, a thermometer, a hygrometer, an accelerometer, an air quality sensor, an activity recognition sensor, and a face detection sensor.

In some embodiments, the hygiene compliance score may be requested via a mapping application and output to the mapping application.

In some embodiments, the hygiene compliance score may be requested via a mapping application on a client computing device communicatively coupled to the computing platform and output to the mapping application for display on a user interface of the client computing device. The hygiene compliance score may be requested via a client computing device communicatively coupled to the computing platform and output for display on a user interface of the client computing device.

In some embodiments, the received data may be processed to identify the hygiene-related information received from the one or more data sources for analysis. The received data may be processed via at least one of filtering or smoothing the received data. The received data may be processed via at least one of filtering the received data or controlling an amount of the received data captured based on a type of establishment, a time of day, or combinations thereof. The type of establishment may comprise a food-serving establishment or a non-food-serving establishment. The time of day may comprise during business hours or after business hours.

In some embodiments, the one or more data sources may further comprise an enterprise user computing device configured to capture hygiene-related information via a graphical user interface. The hygiene-related information captured via the graphical user interface of the enterprise user computing devices may comprise at least one of information input regarding how often equipment is sanitized, whether mask wearing is enforced, whether handwashing stations are available, or an indoor air quality index rating. The indoor air quality index rating may be configured to be input via a selection on a sliding scale on the graphical user interface of the enterprise user computing device.

In accordance with another embodiment, a computing platform may comprise at least one processor, a communication interface, a client computing device communicatively coupled to the computing platform and comprising a user interface, an enterprise user computing device communicatively coupled to the computing platform and comprising a graphical user interface, and memory storing computer-readable instructions. When executed by the at least one processor, the computer-readable instructions may cause the computing platform to: receive hygiene-related information from one or more data sources, wherein the one or more data sources includes one or more sensors for capturing the hygiene-related information and the enterprise user computing device configured to capture hygiene-related information via the graphical user interface, analyze the hygiene-related information received from the one or more data sources, generate a hygiene compliance score, wherein the hygiene compliance score indicates an extent to which the hygiene-related information matches a plurality of guidelines, store the hygiene-related information in a database, and output the hygiene compliance score in response to a request, wherein the hygiene compliance score is requested via a mapping application on the client computing device and output to the mapping application for display on the user interface of the client computing device.

In accordance with yet another embodiment, a method may include receiving, via a processor of a computing platform, hygiene-related information from one or more data sources, wherein the one or more data sources includes one or more sensors for capturing the hygiene-related information, analyzing the hygiene-related information received from the one or more data sources, generating, via the processor of the computing platform, a hygiene compliance score, wherein the hygiene compliance score indicates an extent to which the hygiene-related information matches a plurality of guidelines, storing the hygiene-related information in a database, and outputting the hygiene compliance score in response to a request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2C depict an illustrative event sequence for a multi-computer processing system for compliance monitoring and control in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1A:
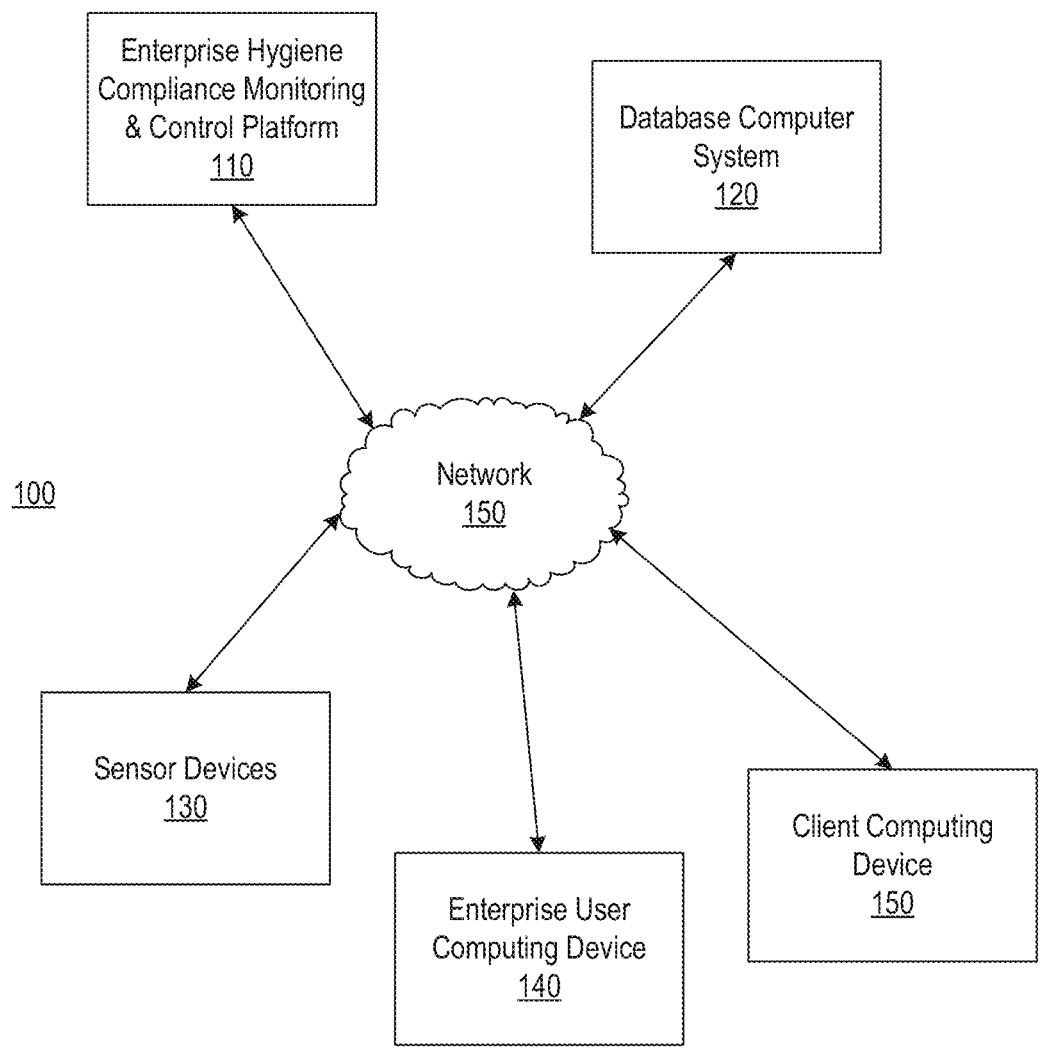
FIGS. 1A and 1B depict an illustrative computing environment for a multi-computer processing system for compliance monitoring and control in accordance with one or more example embodiments.
Figure 1B:
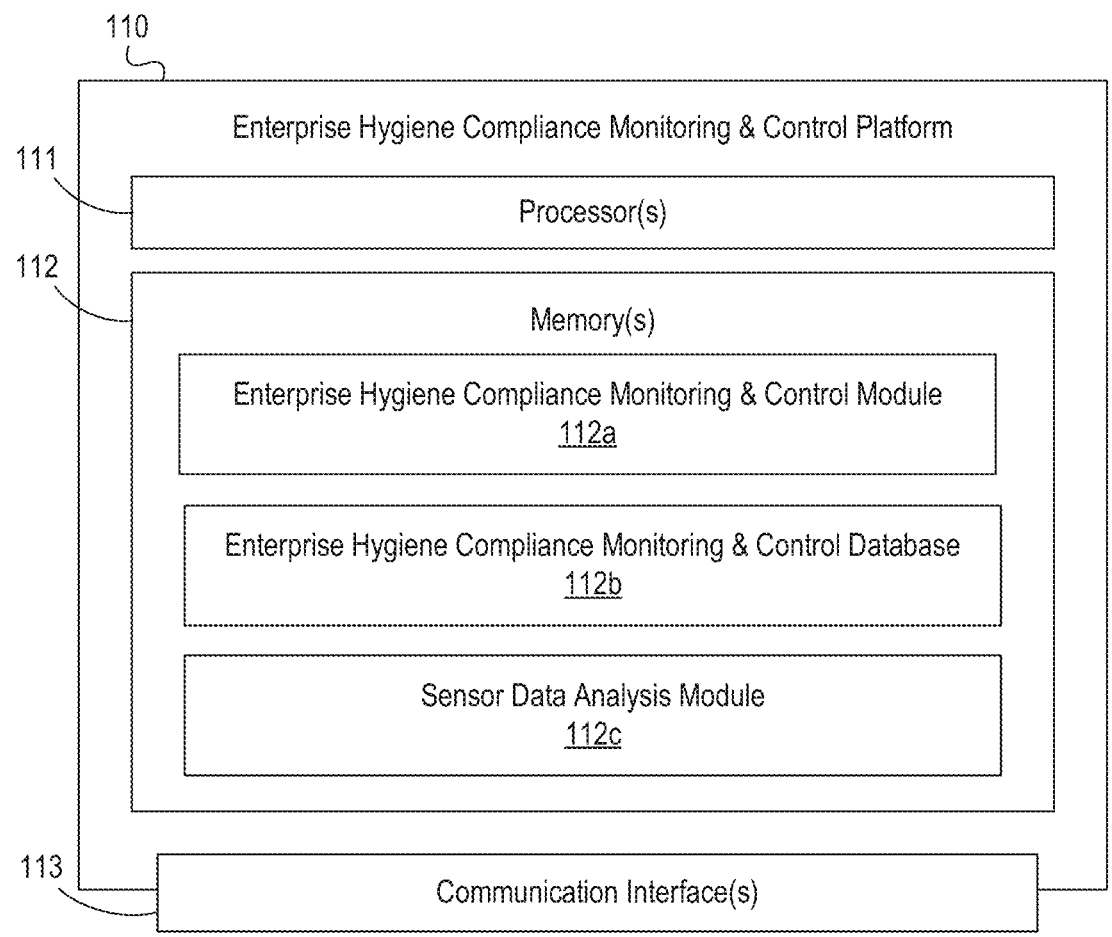

FIGS. 1A and 1B depict an illustrative computing environment for a multi-computer processing system for compliance monitoring and control in accordance with one or more example embodiments. Referring to FIG. 1A, computing environment 100 may include one or more computer systems. For example, computing environment 100 may include enterprise hygiene compliance monitoring and control platform 110, database computer system 120, sensor devices 130, enterprise user computing device 140, and client computing device 150.

As illustrated in greater detail below, enterprise hygiene compliance monitoring and control platform 110 may include one or more computing devices configured to perform one or more of the functions described herein. For example, enterprise hygiene compliance monitoring and control platform 110 may include one or more computers (e.g., laptop computers, desktop computers, servers, server blades, or the like) and/or other computer components (e.g., processors, memories, communication interfaces). In addition, and as illustrated in greater detail below, enterprise hygiene compliance monitoring and control platform 110 may be configured to generate an enterprise hygiene score, which may indicate, for example, how closely an establishment follows best practices established by public health organizations.

Database computer system 120 may include one or more computers (e.g., laptop computers, desktop computers, servers, server blades, or the like) and/or other computer components (e.g., processors, memories, communication interfaces). In some instances, database computer system 120 may be configured to store and provide information that may be sent to a client computing device. For example, the database computer system 120 may store information about various hygiene practices of various establishments in the form of electronic records. In some instances, the database computer system 120 may be configured to communicate with the client computing device 150 and/or otherwise communicate with one or more users of the client computing device 150 using the stored information. Although shown as two distinct devices in FIG. 1A, in some instances, database computer system 120 and enterprise hygiene compliance monitoring and control platform 110 may exist and/or operate as a single computing device, system, or platform. Thus, actions described herein as performed by the database computer system 120 and/or the enterprise hygiene compliance monitoring and control platform 110 may be performed by either device respectively without departing from the scope of the disclosure.

Sensor devices 130 may be video cameras, security cameras, microphones, infrared (IR) sensors, thermometers, hygrometers, accelerometers, air quality sensors, activity recognition sensors, face detection sensors, and/or the like that may be located and/or installed at a business or retail establishment (e.g., a restaurant, gym, medical facility, daycare facility, dental office, aquatic facility, or the like). Although sensor devices 130 are shown schematically as a single item in the computing environment 100, sensor devices 130 may include a plurality of different sensing devices, different types of sensing devices, and the like, arranged at a single entity or arranged at a plurality of different entities.

Enterprise user computing device 140 may be a laptop computer, desktop computer, mobile device, tablet, or other personal computing device that may be linked to and/or used by a first user (who may, e.g., be a manager or an owner of an enterprise organization). In some instances, the enterprise user computing device 140 may be configured to display graphical user interfaces (e.g., which may allow the first user to input hygiene-related information about their establishment).

Client computing device 150 may be a laptop computer, desktop computer, mobile device, tablet, or other personal computing device that may be linked to and/or used by a second user (who may, e.g., be a potential customer of an establishment). In some instances, the client computing device 150 may be configured to display graphical user interfaces (e.g., which may include information from the database computer system 120, including a hygiene practice/compliance score or rating, or which may which may allow the second user to input hygiene-related information about an establishment).

Computing environment 100 also may include one or more networks, which may interconnect one or more of enterprise hygiene compliance monitoring and control platform 110, database computer system 120, sensor devices 130, enterprise user computing device 140, client computing device 150, and/or one or more other systems, public networks, sub-networks, and/or the like. For example, computing environment 100 may include a network 150.

In one or more arrangements, enterprise hygiene compliance monitoring and control platform 110, database computer system 120, sensor devices 130, enterprise user computing device 140, client computing device 150 and/or the other systems included in computing environment 100 may be any type of computing device capable of receiving a user interface, receiving input via the user interface, and/or communicating the received input to one or more other computing devices. For example, the systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of enterprise hygiene compliance monitoring and control platform 110, database computer system 120, sensor devices 130, enterprise user computing device 140 and/or client computing device 150 may, in some instances, be special-purpose computing devices configured to perform specific functions as discussed herein.

Referring to FIG. 1B, enterprise hygiene compliance monitoring and control platform 110 may include one or more processor(s) 111, memory(s) 112, and communication interface(s) 113. A data bus may interconnect processor 111, memory 112, and communication interface 113. Communication interface 113 may be a network interface configured to support communication between enterprise hygiene compliance monitoring and control platform 110 and one or more networks (e.g., network 150, or the like). Memory 112 may include one or more program modules having instructions that when executed by processor 111 cause enterprise hygiene compliance monitoring and control platform 110 to perform one or more functions described herein and/or one or more databases that may store and/or otherwise maintain information which may be used by such program modules and/or processor 111. In some instances, the one or more program modules and/or databases may be stored by and/or maintained in different memory units of enterprise hygiene compliance monitoring and control platform 110 and/or by different computing devices that may form and/or otherwise make up enterprise hygiene compliance monitoring and control platform 110. For example, memory 112 may have, store, and/or include an enterprise hygiene compliance monitoring and control module 112a, an enterprise hygiene compliance monitoring and control database 112b, and a sensor data analysis module 112c. Enterprise hygiene compliance monitoring and control module 112a may have instructions that direct and/or cause enterprise hygiene compliance monitoring and control platform 110 to generate hygiene compliance scores accordingly, as discussed in greater detail below. Enterprise hygiene compliance monitoring and control database 112b may store information (e.g., enterprise profiles, hygiene compliance information, or the like) used by enterprise hygiene compliance monitoring and control module 112a and/or enterprise hygiene compliance monitoring and control platform 110 in generating and updating hygiene compliance scores and/or in performing other functions. Sensor data analysis module 112c may store instructions and/or data that may cause or enable enterprise hygiene compliance monitoring and control platform 110 to receive sensor data from one or more sensor devices 130 and analyze the sensor data. In some examples, sensor data analysis module 112c may receive raw sensor data and may process the data (e.g., filter, smooth, or the like) to identify data for analysis (e.g., data to provide the most accurate analysis available). For example, sensor data analysis module 112c may filter and/or control an amount or type of data captured based on a type of establishment (e.g., food-serving establishment or non-food-serving establishment), a time of day (e.g., during business hours or after business hours), or the like.

Figure 2A:
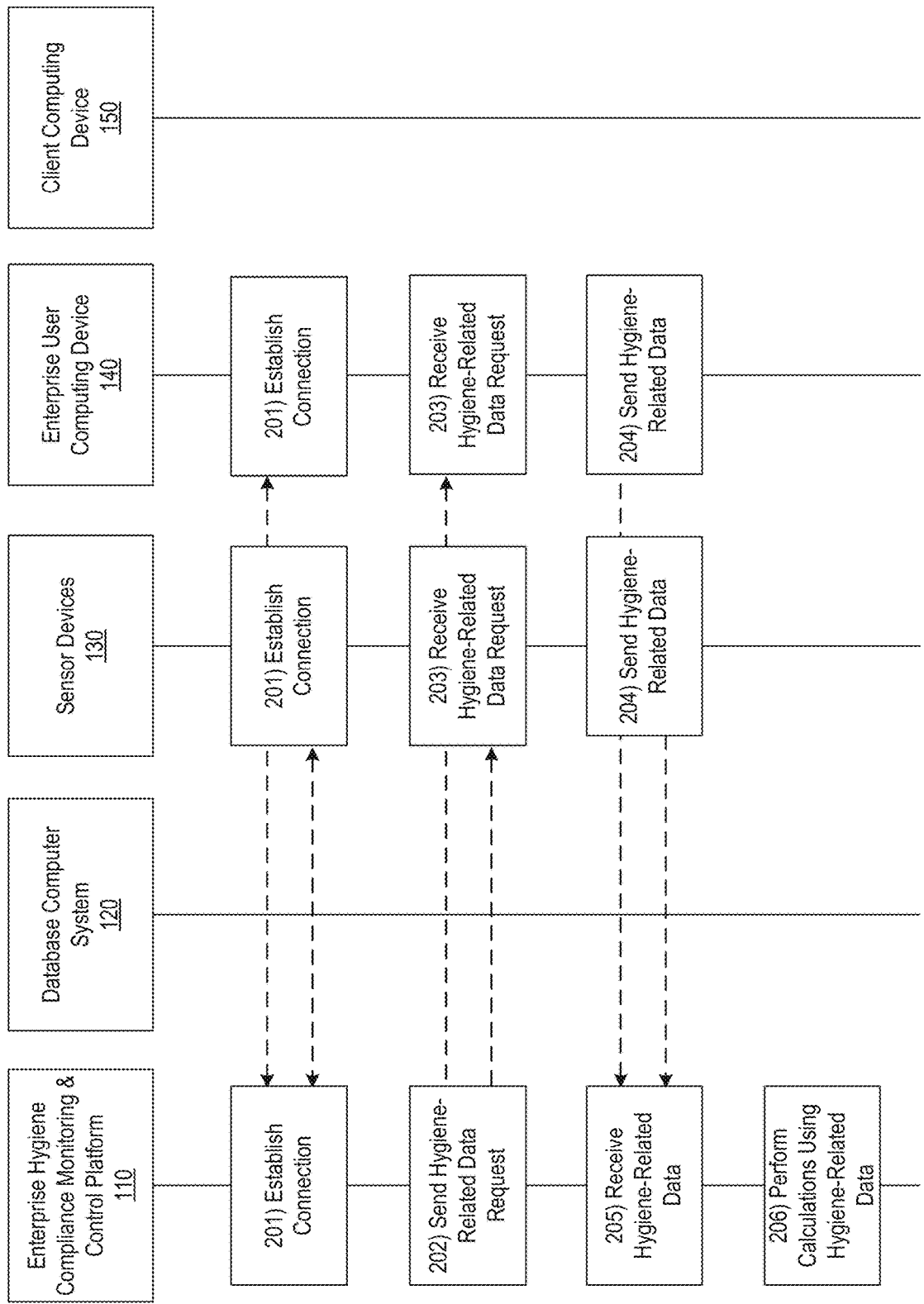
Figure 2B:
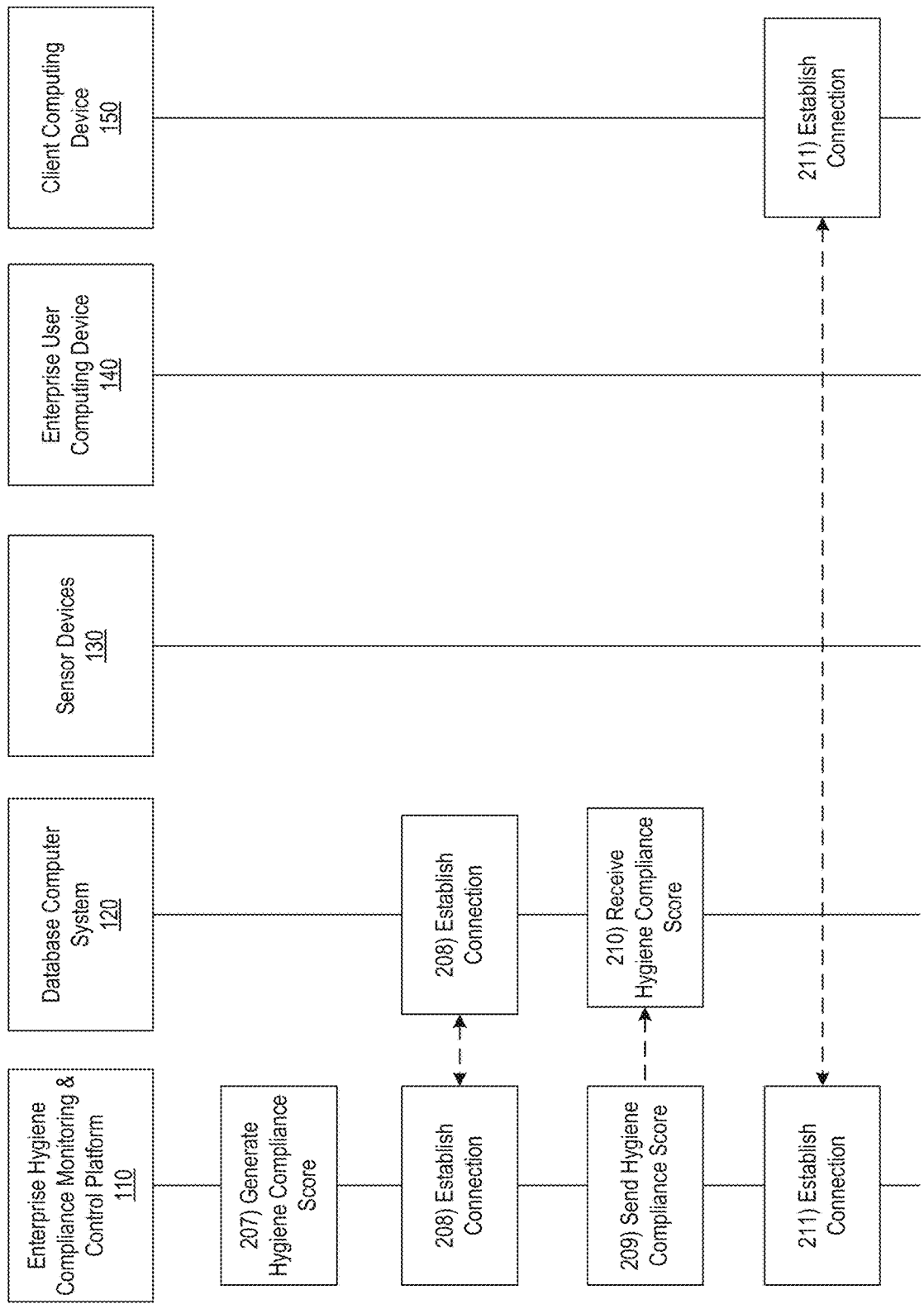

FIGS. 2A-2C depict an illustrative event sequence for a multi-computer processing system for compliance monitoring and control in accordance with one or more example embodiments. Referring to FIG. 2A, at step 201, enterprise hygiene compliance monitoring and control platform 110 may establish a connection with sensor devices 130 and/or enterprise user computing device 140. For example, enterprise hygiene compliance monitoring and control platform 110 may establish a first wireless data connection with sensor devices 130 to link enterprise hygiene compliance monitoring and control platform 110 to sensor devices 130 (e.g., for purposes of requesting sensor data) and may establish a second wireless data connection with enterprise user computing device 140 to link enterprise hygiene compliance monitoring and control platform 110 to enterprise user computing device 140 (e.g., for purposes of requesting self-audit data). In some instances, enterprise hygiene compliance monitoring and control platform 110 may determine whether a connection is established with sensor devices 130 and/or enterprise user computing device 140. For example, if enterprise hygiene compliance monitoring and control platform 110 determines that a connection is already established with sensor devices 130 and/or enterprise user computing device 140, enterprise hygiene compliance monitoring and control platform 110 might not re-establish one or more of the connections. If a connection was not previously established with sensor devices 130 and/or enterprise user computing device 140, enterprise hygiene compliance monitoring and control platform 110 may establish the first wireless data connection and/or second wireless data connection as described herein.

At step 202, enterprise hygiene compliance monitoring and control platform 110 may send a request for first hygiene-related data to sensor devices 130 and/or a request for second hygiene-related data to enterprise user computing device 140. In some instances, enterprise hygiene compliance monitoring and control platform 110 may send the request for first hygiene-related data to sensor devices 130 via communication interface 113 and while the first wireless data connection is established. Additionally or alternatively, enterprise hygiene compliance monitoring and control platform 110 may send the request for second hygiene-related data to enterprise user computing device 140 via communication interface 113 and while the second wireless data connection is established. In some instances, enterprise hygiene compliance monitoring and control platform 110 may repeatedly send the hygiene-related data requests at a predetermined interval. Additionally or alternatively, in sending the hygiene-related data requests, enterprise hygiene compliance monitoring and control platform 110 may request that sensor devices 130 and/or enterprise user computing device 140 send data to enterprise hygiene compliance monitoring and control platform 110 as it is received (e.g., to sync the data with enterprise hygiene compliance monitoring and control platform 110 as it is received). In doing so, enterprise hygiene compliance monitoring and control platform 110 may maintain an up-to-date collection of hygiene-related data for use in assessing, determining, and/or calculating a hygiene compliance score.

Figure 3:
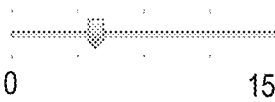
FIGS. 3 and 4 depict example graphical user interfaces for a multi-computer processing system for compliance monitoring and control in accordance with one or more example embodiments.

For example, in sending the request for hygiene-related data, enterprise hygiene compliance monitoring and control platform 110 may cause enterprise user computing device 140 to display and/or otherwise present one or more graphical user interfaces similar to graphical user interface 300, which is illustrated in FIG. 3. As seen in FIG. 3, graphical user interface 300 may include text and/or other information showing a set of features for the first user to input hygiene-related information about their establishment (e.g., "How often is equipment sanitized?" [select frequency]; "Is mask wearing enforced?" [Yes/No]; "Are handwashing stations available?" [Yes/No]; "Indoor air quality (IAQ) index" [select on sliding scale]).

Returning to FIG. 2A, at step 203, sensor devices 130 and/or enterprise user computing device 140 may receive the hygiene-related data requests sent at step 202. For example, sensor devices 130 may receive the request for first hygiene-related data while the first wireless data connection is established, and enterprise user computing device 140 may receive the request for second hygiene-related data while the second wireless data connection is established.

At step 204, sensor devices 130 and/or enterprise user computing device 140 may send hygiene-related data to enterprise hygiene compliance monitoring and control platform 110. In some instances, sensor devices 130 may send hygiene-related data while the first wireless data connection is established and enterprise user computing device 140 may send hygiene-related data while the second wireless data connection is established. In some instances, as described above, sensor devices 130 and/or enterprise user computing device 140 may send the hygiene-related data based on receiving the hygiene-related data requests from enterprise hygiene compliance monitoring and control platform 110. In some instances, sensor devices 130 and/or enterprise user computing device 140 may send hygiene-related data to the enterprise hygiene compliance monitoring and control platform 110 as it is collected or otherwise received (e.g., to maintain a data sync between enterprise hygiene compliance monitoring and control platform 110, sensor devices 130, and/or enterprise user computing device 140). In some instances, in sending the first hygiene-related data, sensor devices 130 may send data captured by video cameras, security cameras, microphones, infrared (IR) sensors, thermometers, hygrometers, accelerometers, air quality sensors, activity recognition sensors, face detection sensors, audio sensors/microphones, and/or the like. Additionally or alternatively, in sending second hygiene-related data, the enterprise user computing device 140 may send data regarding equipment sanitation frequency, refrigeration temperatures, indoor air quality, availability of handwashing stations, enforcement or use of personal protective equipment (PPE) (if applicable), enforcement of social distancing (if applicable), or the like.

At step 205, enterprise hygiene compliance monitoring and control platform 110 may receive the hygiene-related data sent at step 204. For example, enterprise hygiene compliance monitoring and control platform 110 may receive the hygiene-related data via communication interface 113 while the first and/or second wireless data connections are respectively established. Additionally or alternatively, in some embodiments, enterprise hygiene compliance monitoring and control platform 110 may download hygiene-related data from the internet (e.g., public records) or other source (e.g., a third party).

At step 206, enterprise hygiene compliance monitoring and control platform 110 may analyze the hygiene-related information received from the one or more data sources to generate and/or assign a hygiene compliance score or rating (e.g., an overall hygiene practice score/rating for a business establishment). In some examples, optical character recognition, object recognition, natural language processing, and the like, may be used to analyze sensor data received (e.g., image data, audio data, and the like). In this regard, enterprise hygiene compliance monitoring and control platform 110 may control when to capture data from the sensors, which sensors to activate during which times, how often the sensors collect data (e.g., continuously or periodically), what type of data to collect, or other condition-based control of the sensors. For instance, camera data may be less useful during off hours and therefore camera sensors may be controlled to be deactivated during off hours. On the other hand, temperature data for food storage may be more significant outside of business hours when a failure may go unnoticed and therefore temperature sensors may be controlled to remain on during off hours. In some examples, analyzing the hygiene-related information may include comparing received and/or processed sensor data to one or more protocols, regulations, or the like. For example, in analyzing the hygiene-related information received from the one or more data sources, enterprise hygiene compliance monitoring and control platform 110 may extract a number of hygiene-related factors from the hygiene-related information and score each factor based on the comparison between the received and/or processed sensor data and the one or more protocols or regulations using a point system, letter system, or other scoring scale. Additionally or alternatively, enterprise hygiene compliance monitoring and control platform 110 may assign different weighted values to different factors (e.g., such that relative importance of each factor may be given) and each factor may be considered together in determining an overall hygiene practice score.

Referring to FIG. 2B, at step 207, enterprise hygiene compliance monitoring and control platform 110 may generate the hygiene compliance score. For example, the hygiene compliance score may be calculated as a weighted sum of measured factors or parameters, or using other suitable calculation. Additionally or alternatively, weighted data may be entered into an algorithm that performs a calculation to generate the hygiene compliance score (e.g., a numerical value). In some examples, certain factors may be weighted more than others. For example, during flu season or during an outbreak of an infectious disease, factors such as the availability of handwashing stations and enforcement or use of personal protective equipment (PPE) may have a higher weighting (e.g., weighted more heavily) than refrigeration temperatures. Additionally or alternatively, certain factors may act as sole determinants, outweighing all other factors (e.g., no availability of handwashing stations may result in a lowest hygiene compliance score being assigned despite other factors). Additionally or alternatively, certain factors may be weighted evenly when calculating the hygiene compliance score.

At step 208, the enterprise hygiene compliance monitoring and control platform 110 may establish a connection with the database computer system 120. In some instances, the enterprise hygiene compliance monitoring and control platform 110 may establish a third wireless data connection with the database computer system 120 to link the enterprise hygiene compliance monitoring and control platform 110 to the database computer system 120. In some instances, the enterprise hygiene compliance monitoring and control platform 110 may identify whether a connection is already established with the database computer system 120. If a connection is already established with the database computer system 120, the enterprise hygiene compliance monitoring and control platform 110 might not reestablish the connection. If a connection is not already established with the database computer system 120, the enterprise hygiene compliance monitoring and control platform 110 may establish the second wireless data connection as described herein.

At step 209, enterprise hygiene compliance monitoring and control platform 110 may send the hygiene compliance score to database computer system 120 and, at step 210, cause database computer system 120 to store the hygiene-related information in a database.

At step 211, enterprise hygiene compliance monitoring and control platform 110 may establish a connection with client computing device 150. For example, enterprise hygiene compliance monitoring and control platform 110 may establish a fourth wireless data connection with client computing device 150 to link enterprise hygiene compliance monitoring and control platform 110 to client computing device 150 (e.g., for the purpose of sending interface display commands). In some instances, enterprise hygiene compliance monitoring and control platform 110 may identify whether or not a connection is already established with client computing device 150. If a connection is already established with client computing device 150, enterprise hygiene compliance monitoring and control platform 110 might not re-establish the connection. If a connection is not yet established with client computing device 150, the enterprise hygiene compliance monitoring and control platform may establish the fourth wireless data connection as described herein.

Referring to FIG. 2C, at step 212, enterprise hygiene compliance monitoring and control platform 110 may receive, via the communication interface (e.g., communication interface 113), a request for a hygiene compliance score from client computing device 150.

At step 213, in response to the request, enterprise hygiene compliance monitoring and control platform 110 may send one or more commands directing client computing device 150 to display the hygiene compliance score. For example, enterprise hygiene compliance monitoring and control platform 110 may send the one or more commands directing client computing device 150 to display the hygiene compliance score via the communication interface and while the fourth wireless data connection is established.

At step 214, client computing device 150 may receive the one or more commands directing client computing device 150 to display the hygiene compliance score. In some instances, client computing device 150 may receive the one or more commands directing client computing device 150 to display the hygiene compliance score while the fourth wireless data connection is established.

At step 215, client computing device 150 may display the hygiene compliance score. For example, client computing device 150 may display the hygiene compliance score based on or in response to the one or more commands directing client computing device 150 to display the hygiene compliance score received at step 214. For example, client computing device 150 may display the hygiene compliance score formatted based on a type of communication channel (e.g., chatbots, automated emails, texts, toggle options, push notifications, third party application programming interfaces, social media postings, or the like).

In some embodiments, the enterprise hygiene compliance monitoring and control platform 110 may be implemented using an add-on or plug-in application to an existing computer program such as a navigation program. For example, the hygiene compliance score may be requested via a mapping application (e.g., navigation application, location application) and output to the mapping application.

Figure 4:

In some instances, in displaying the hygiene compliance score, client computing device 150 may display a graphical user interface similar to graphical user interface 400, which is shown in FIG. 4. For example, client computing device 150 may display a navigation interface where the user may interact with the interface (e.g., via a user interface button, "See Hygiene Score") to retrieve hygiene compliance information about an establishment located at a particular location (e.g., a hygiene compliance score of an establishment located at [Address 1]).

Figure 5:
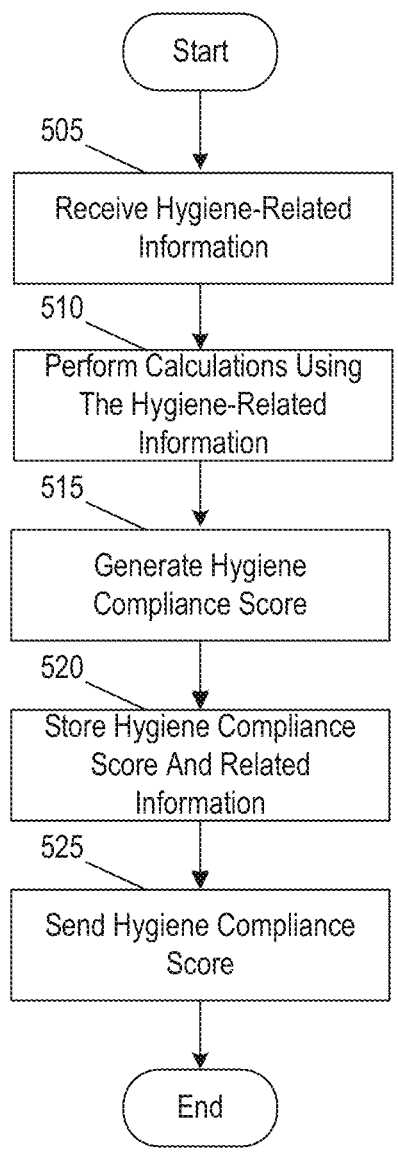
FIG. 5 depicts an illustrative method for a multi-computer processing system for compliance monitoring and control in accordance with one or more example embodiments.

FIG. 5 depicts an illustrative method for a multi-computer processing system for compliance monitoring and control in accordance with one or more example embodiments. Referring to FIG. 5, at step 505, a computing platform having at least one processor, a communication interface, and memory storing computer-readable instructions may receive hygiene-related information from one or more data sources. In addition, the one or more data sources includes one or more sensors for capturing the hygiene-related information. At step 510, the computing platform may analyze the hygiene-related information received from the one or more data sources. At step 515, the computing platform may generate a hygiene compliance score. In addition, the hygiene compliance score may indicate an extent to which the hygiene-related information matches a plurality of guidelines (e.g., public health guidelines). At step 520, the computing platform may store the hygiene-related information in a database. At step 525, the computing platform may output the hygiene compliance score in response to a request.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface; and
   memory storing computer-readable instructions that, when executed by the at least one processor, cause the computing platform to:
   receive hygiene-related information from one or more data sources, wherein the one or more data sources includes one or more sensors for capturing the hygiene-related information;
   filter the hygiene-related information based on a type of establishment the hygiene-related information is associated with and a time of day the hygiene-related information corresponds to, wherein filtering the hygiene-related information generates a set of filtered hygiene-related information;
   analyze the filtered hygiene-related information, wherein analyzing the filtered hygiene-related information includes at least the step of assigning a weighted value to one or more factors of the filtered hygiene-related information;
   generate a hygiene compliance score, wherein the hygiene compliance score indicates an extent to which the filtered hygiene-related information matches a plurality of guidelines;
   store the hygiene-related information in a database; and
   output the hygiene compliance score in response to a request.

2. The computing platform of claim 1, wherein the one or more sensors include one or more of: a video camera, a security camera, a microphone, an infrared sensor, a thermometer, a hygrometer, an accelerometer, an air quality sensor, an activity recognition sensor, and a face detection sensor.

3. The computing platform of claim 1, wherein the hygiene compliance score is requested via a mapping application and output to the mapping application.

4. The computing platform of claim 1, wherein the hygiene compliance score is requested via a mapping application on a client computing device communicatively coupled to the computing platform and output to the mapping application for display on a user interface of the client computing device.

5. The computing platform of claim 1, wherein the hygiene compliance score is requested via a client computing device communicatively coupled to the computing platform and output for display on a user interface of the client computing device.

6. The computing platform of claim 1, wherein the memory stores computer-readable instructions that, when executed by the at least one processor, further cause the computing platform to:
   process received data to identify the hygiene-related information received from the one or more data sources for analysis.

7. The computing platform of claim 6, wherein the received data is processed via smoothing the received data.

8. The computing platform of claim 6, wherein the received data is processed via controlling an amount of the received data captured based on a type of establishment, a time of day, or combinations thereof.

9. The computing platform of claim 8, wherein the type of establishment comprises a food-serving establishment or a non-food-serving establishment.

10. The computing platform of claim 8, wherein the time of day comprises during business hours or after business hours.

11. The computing platform of claim 1, wherein the one or more data sources further comprises an enterprise user computing device configured to capture hygiene-related information via a graphical user interface.

12. The computing platform of claim 11, wherein the hygiene-related information captured via the graphical user interface of the enterprise user computing devices comprises at least one of information input regarding how often equipment is sanitized, whether mask wearing is enforced, whether handwashing stations are available, or an indoor air quality index rating.

13. The computing platform of claim 12, wherein the indoor air quality index rating is configured to be input via a selection on a sliding scale on the graphical user interface of the enterprise user computing device.

14. A computing platform comprising:
    at least one processor;
    a communication interface;
    a client computing device communicatively coupled to the computing platform and comprising a user interface;
    an enterprise user computing device communicatively coupled to the computing platform and comprising a graphical user interface; and
    memory storing computer-readable instructions that, when executed by the at least one processor, cause the computing platform to:
    receive hygiene-related information from one or more data sources, wherein the one or more data sources includes one or more sensors for capturing the hygiene-related information and the enterprise user computing device configured to capture hygiene-related information via the graphical user interface;

filter the hygiene-related information based on a type of establishment the hygiene-related information is associated with and a time of day the hygiene-related information corresponds to, wherein filtering the hygiene-related information generates a set of filtered hygiene-related information;

analyze the filtered hygiene-related information, wherein analyzing the filtered hygiene-related information includes at least the step of assigning a weighted value to one or more factors of the filtered hygiene-related information;

generate a hygiene compliance score, wherein the hygiene compliance score indicates an extent to which the filtered hygiene-related information matches a plurality of guidelines;

store the hygiene-related information in a database; and output the hygiene compliance score in response to a request, wherein the hygiene compliance score is requested via a mapping application on the client computing device and output to the mapping application for display on the user interface of the client computing device.

15. The computing platform of claim 14, wherein the one or more sensors include one or more of: a video camera, a security camera, a microphone, an infrared sensor, a thermometer, a hygrometer, an accelerometer, an air quality sensor, an activity recognition sensor, and a face detection sensor.

16. The computing platform of claim 14, wherein the memory stores computer-readable instructions that, when executed by the at least one processor, further cause the computing platform to:

process received data to identify the hygiene-related information received from the one or more data sources for analysis.

17. The computing platform of claim 16, wherein the received data is processed via smoothing the received data.

18. The computing platform of claim 16, wherein the received data is processed via controlling an amount of the received data captured based on a type of establishment, a time of day, or combinations thereof.

19. The computing platform of claim 14, wherein the hygiene-related information captured via the graphical user interface of the enterprise user computing devices comprises at least one of information input regarding how often equipment is sanitized, whether mask wearing is enforced, whether handwashing stations are available, or an indoor air quality index rating.

20. A method, the method comprising:

receiving, via a processor of a computing platform, hygiene-related information from one or more data sources, wherein the one or more data sources includes one or more sensors for capturing the hygiene-related information;

filtering the hygiene-related information based on a type of establishment the hygiene-related information is associated with and a time of day the hygiene-related information corresponds to, wherein filtering the hygiene-related information generates a set of filtered hygiene-related information;

analyzing the filtered hygiene-related information, wherein analyzing the filtered hygiene-related information includes at least the step of assigning a weighted value to one or more factors of the filtered hygiene-related information;

generating, via the processor of the computing platform, a hygiene compliance score, wherein the hygiene compliance score indicates an extent to which the filtered hygiene-related information matches a plurality of guidelines;

storing the hygiene-related information in a database; and outputting the hygiene compliance score in response to a request.

* * * * *